United States Patent
Engin et al.

(10) Patent No.: US 7,373,324 B1
(45) Date of Patent: May 13, 2008

(54) METHOD AND SYSTEM FOR EXCHANGE OF FINANCIAL INVESTMENT ADVICE

(75) Inventors: Kerimcan Engin, Chicago, IL (US); Robert Charles Osborne, Chicago, IL (US)

(73) Assignee: Robert C. Osborne, Evanston, IL (US)

( * ) Notice: Subject to any disclaimer, the term of this patent is extended or adjusted under 35 U.S.C. 154(b) by 0 days.

(21) Appl. No.: 09/589,253

(22) Filed: Jun. 7, 2000

Related U.S. Application Data

(60) Provisional application No. 60/158,094, filed on Oct. 7, 1999.

(51) Int. Cl.
G06Q 40/00 (2006.01)

(52) U.S. Cl. .................... 705/36 R; 705/35; 705/37
(58) Field of Classification Search ............. 705/35–37
See application file for complete search history.

(56) References Cited

U.S. PATENT DOCUMENTS

| | | | |
|---|---|---|---|
| 4,989,141 A | 1/1991 | Lyons et al. ................ 364/408 |
| 5,126,936 A | 6/1992 | Champion et al. .......... 364/408 |
| 5,132,899 A | 7/1992 | Fox ............................. 364/408 |
| 5,220,500 A | 6/1993 | Baird et al. ................. 364/408 |
| 5,502,637 A * | 3/1996 | Beaulieu et al. ............. 705/36 |
| 5,644,727 A | 7/1997 | Atkins ........................ 395/240 |
| 5,692,233 A | 11/1997 | Garman ....................... 705/36 |
| 5,710,887 A | 1/1998 | Chelliah et al. ............ 395/226 |
| 5,784,696 A | 7/1998 | Melnikoff .................... 705/36 |
| 5,812,987 A | 9/1998 | Luskin et al. ................ 705/36 |
| 5,864,828 A | 1/1999 | Atkins ......................... 705/36 |
| 5,873,071 A | 2/1999 | Ferstenberg et al. ......... 705/37 |
| 5,875,437 A | 2/1999 | Atkins ......................... 705/40 |
| 5,884,285 A | 3/1999 | Atkins ......................... 705/36 |
| 5,884,287 A | 3/1999 | Edesess ...................... 705/36 |
| 5,893,079 A * | 4/1999 | Cwenar ....................... 705/36 |
| 5,911,136 A | 6/1999 | Atkins ........................ 705/36 |
| 5,920,848 A | 7/1999 | Schutzer et al. ............. 705/42 |
| 5,991,743 A | 11/1999 | Irving et al. ................. 705/36 |
| 6,018,722 A * | 1/2000 | Ray et al. .................... 705/36 |
| 6,021,397 A | 2/2000 | Jones et al. .................. 705/36 |

(Continued)

OTHER PUBLICATIONS

"A Few Brokerage Firms Experiment with No-Commission Stock Trading" by Carrie Lee, May 26, 2000, 4 pages, The Wall Street Journal.

(Continued)

Primary Examiner—Narayanswamy Subramanian
(74) Attorney, Agent, or Firm—Gavrilovich, Dodd & Lindsey LLP

(57) ABSTRACT

A method and system for distributing professional investment advice to investors is provided. A computerized exchange system permits one or more advisors to make investment strategies available to subscribing investors. Each strategy defines a sequence of trade transactions that are consistent with strategy parameters and are designed to achieve the risk and return objectives of the strategy. The strategies are distributed to subscribers who can undertake the recommended transactions using separate brokerage accounts. A subscriber can maintain a corresponding portfolio that assigns weighting factors to various strategies in order to provide a customized investment strategy. Accordingly, the exchange system can provide professional fund manager trading decisions to individual investors in near real time without the administrative burdens or costs associated with traditional mutual funds.

17 Claims, 8 Drawing Sheets

U.S. PATENT DOCUMENTS

| | | | | |
|---|---|---|---|---|
| 6,317,726 | B1* | 11/2001 | O'Shaughnessy | 705/36 |
| 6,484,151 | B1* | 11/2002 | O'Shaughnessy | 705/36 |
| 2002/0147672 | A1* | 10/2002 | Gaini | 705/36 |
| 2002/0156722 | A1* | 10/2002 | Greenwood | 705/37 |
| 2003/0093352 | A1* | 5/2003 | Muralidhar et al. | 705/36 |
| 2003/0120575 | A1* | 6/2003 | Wallman | 705/36 |
| 2004/0088236 | A1* | 5/2004 | Manning | 705/35 |
| 2004/0133497 | A1* | 7/2004 | Spear | 705/36 |
| 2005/0004857 | A1* | 1/2005 | Schwarz et al. | 705/36 |
| 2005/0010510 | A1* | 1/2005 | Brose et al. | 705/35 |
| 2005/0090911 | A1* | 4/2005 | Ingargiola et al. | 700/36 |
| 2005/0240456 | A1* | 10/2005 | Ward et al. | 705/7 |
| 2006/0069635 | A1* | 3/2006 | Ram et al. | 705/37 |
| 2006/0277124 | A1* | 12/2006 | Gerrietts | 705/35 |
| 2006/0282363 | A1* | 12/2006 | Tarbox et al. | 705/35 |

OTHER PUBLICATIONS

"U.S. Household Ownership of Mutual Funds in 1999", Sep. 1999, 4 pages, FUNDAMENTALS.

"An E-Mall for High-End Investors", Jul. 24, 2000, 2 pages, Businessweek Online: FRONTIER.

"Where Have All the Geniuses Gone?", by David Whitford, Oct. 11, 1999, 6 pages, Fortune Archives.

"Time to Sell Your Mutual Fund?", by Susan E. Kuhn, Mar. 6, 1995, 12 pages, Fortune Archives.

"A Nation of Traders", by Andy Serwer, 4 pages, FORTUNE.

"Be a Tax-Savvy Investor", by Susan E. Kuhn, Mar. 18, 1996, 5 pages, FORTUNE.

"Mutual Fund Costs, 1980-1998", by John D. Rea, Brian K. Reid, and Travis Lee, Sep. 1999, 11 pages, PERSPECTIVE.

"Many Happy Returns", by Erin Kelly, Apr. 17, 2000, 2 pages, Fortune Investor.

"Mutual Funds Report; In Managed Personal Accounts, A Challenge to Traditional Funds", by Danny Hakim, Jul. 9, 2000, 3 pages, New York Times.

No Magic Formula for Portfolio Diversification, by Kenneth S. Janke, Sr., Apr. 1994, 3 pages, Better Investing.

"Individual Stocks' Allure: Lower Taxes", by Jonathan Clements, Jun 13, 2000, 3 pages, The Wall Street Journal.

"No Free Lunch", by Jeff D. Opdyke, Jun. 12, 2000, 4 pages, SAVIN.

"Midlife Crisis", by Michael Santoli, Apr. 10, 2000, 6 pages, BARRON'S.

"All Trades, All the Time", by Michael Santoli, May 22, 2000, 4 pages, BARRON'S.

"'Focused' Funds Choose to Buy Fewer Stocks and Risks Lessen", by Mara Der Hovanesian, Dec. 20, 1999, 2 pages, SAVIN.

"New Funds Remind Investors of Stocks", by Pui-Wing Tam, Apr. 11, 2000, 2 pages, SAVIN.

"Everybody's a Big Shot", by Richard Bierck, Jan. 31, 1999, 3 pages, MONEY.COM

"Investors Have So Many Online Tools at Their Disposal—If They Know How To Use Them", by Andrew Fraser, Jun. 12, 2000, 5 pages, The Wall Street Journal.

"Buggy-Whip Funds? Former Industry Insider Sees a New, New Thing Supplanting Mutuals", by Michael Santoli, Jun. 26, 2000, 4 pages, BARRON'S.

"Web Firms Offer Managed Accounts", by Christopher Oster, Jun. 23, 2000, 4 pages, SAVIN.

"Although the Mutual-Fund Party Is Hot, A Few Investors Start to Look Elsewhere", by Robert McGough, Apr. 29, 1998, 5 pages, The Wall Street Journal.

"Online Funds, Build to Order", by Patrick McGeehan and Danny Hakim, Aug. 13, 2000, 6 pages, The New York Times.

"What Stock to Pick? Try Your Own Fund", by Carrie Lee, Jul. 18, 2000, 2 pages, The Wall Street Journal.

"To Follow Online Trading, Web Sites Turn to Advice", by Stacy Forster, Aug. 15, 2000, 3 pages, The Wall Street Journal.

* cited by examiner

METHOD AND SYSTEM FOR EXCHANGE OF FINANCIAL INVESTMENT ADVICE This application claims the benefit of U.S. Provisional Application No. 60/158,094, filed on Oct. 7, 1999.

TECHNICAL FIELD

The invention generally relates to computerized information systems, and in particular, to a computer system for facilitating the distribution of financial investment advice.

BACKGROUND OF THE INVENTION

Various agents including authors of financial newsletters, financial planners, mutual fund managers and automated systems can produce financial investment advice. Financial investment advice can be distributed via newsletters, mutual funds, automated investment advice tools on a network or through personal interaction. All serve the purpose of assisting investors in achieving personal investment objectives.

Financial investment advice can be categorized as either direct or indirect. Direct investment advice is commonly purchased (through fees or sales commissions) from financial planners and stockbrokers and is used by the investor to make purchase and sale decisions. More recently, direct advice is being offered through the Internet by automated services such as FinancialEngines.com or DirectAdvice.com. Indirect investment advice comes packaged with an investment vehicle. Mutual funds and insurance annuity products are good examples of instances where the advisor is also responsible for conducting transactions for investors.

One problem with direct advice is the lack of a transparent marketplace for individual investors. Most advisors self-report their performance and often do not have a clear methodology for accommodating diverse styles and risk characteristics. Publications, such as the Hulbert Financial Digest, provide analysis of newsletter advice but they cover a limited portion of the direct advice market. Others, such as the Association of Investment Management and Research's (AIMR) Performance Presentation Standards, also attempt to improve performance reporting but adherence is voluntary and still not widespread.

The mutual fund marketplace does have well-developed methodologies for comparing funds. Such methodologies are employed by services like Morningstar and Lipper. This is one of the reasons there are currently 77 million individual mutual fund investors in the U.S. with $2.7 trillion in equity funds and $900 billion in fixed income funds. Other reasons for the popularity of mutual funds include diversification, ease of use, and wide availability in retirement plans. However, investors incur a significant cost for these advantages. The annual cost of maintaining the necessary legal structure, administering the fund, paying the investment managers, and marketing an actively managed fund typically totals from 1.0% to 2.7% of net asset value (NAV). Moreover, the quantifiable costs do not include additional invisible costs that the fund incurs due to the large size of trades. Studies suggest that these costs can add 80 cents per share to the average commission of 5 cents per share. In fact, they are important enough that BARRA has created a product called the Market Impact Model, which predicts the magnitude of this effect for all stocks in the marketplace. In addition, capital gains distributions that are out of the investor's control can have significant negative impacts on after-tax returns.

BRIEF DESCRIPTION OF DRAWINGS

The invention is pointed out with particularity in the appended claims. The foregoing general summary and the following drawings and detailed description are merely illustrative of the invention, rather than limiting. The scope of the invention is defined by the appended claims and equivalents thereof. Accordingly:

DETAILED DESCRIPTION OF THE PRESENTLY PREFERRED EMBODIMENT(S)

Figure 1:
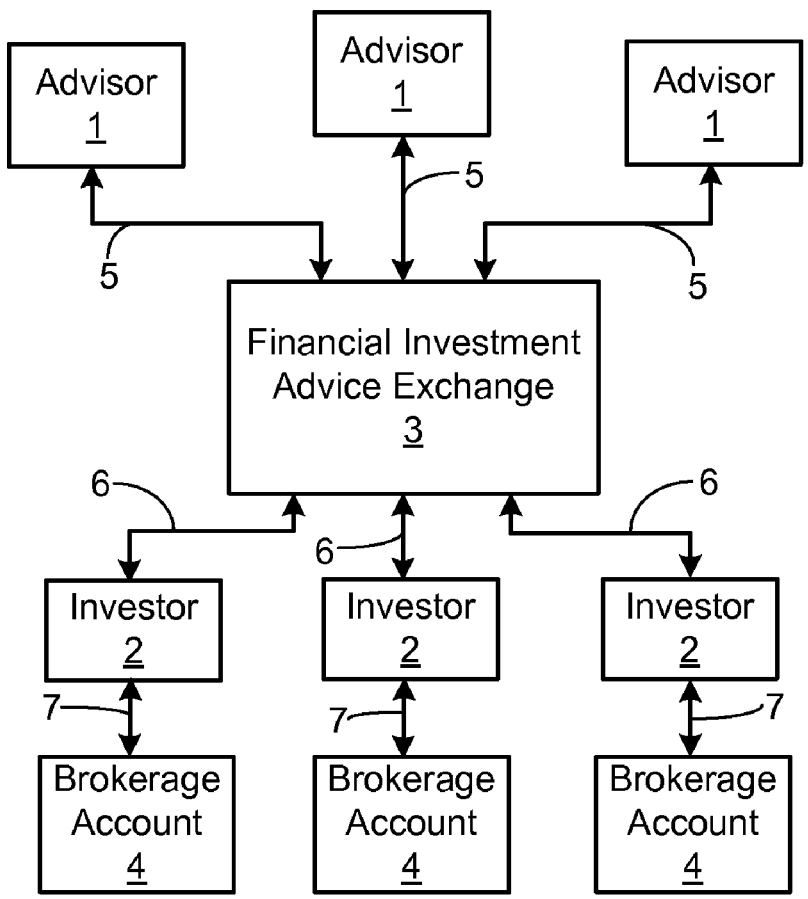
FIG. 1 is a context diagram illustrating a financial investment advice exchange in accordance with one embodiment of the invention.

A system embodying the invention can provide an exchange on a network that allows participants to formulate/distribute or receive/implement financial investment advice. Financial advice is delivered through financial investment strategies that comprise a sequence of precise trade recommendations involving various financial instruments, including but not limited to stocks, stock options, fixed income products, such as U.S. Treasury bonds, swaps, or the like, or commodities, such as gold futures or the like. The financial advice is designed to assist investors in the management of personal investment portfolios maintained in personal brokerage accounts.

In accordance with one embodiment of the invention, the brokerage accounts are held outside the exchange. However, under an alternative embodiment the brokerage services can also be provided by the exchange.

According to one embodiment of the invention, a computerized exchange system provides a conventional mutual fund structure as a direct ownership model, a Virtual Mutual Fund$^{SM}$. A traditional mutual fund has a paid advisor who makes investment decisions and then implements the actual trades for all of the investors in the mutual fund. The exchange system provides a novel architecture that uses a paid advisor who determines the strategy and recommends investments for a portfolio. The system translates advisor strategies into a customized list of precise trade recommendations for each investor to implement directly in his or her own brokerage account. Accordingly, the system can transfer the responsibility for conducting the transactions to the investor and in turn provides greater flexibility to the investor in following the recommendations submitted by the financial advisor.

The present invention provides an efficient and transparent market for financial advice delivered within the context of financial investment strategies. An investment strategy corresponds to the management approach adopted by the portfolio owner for the attainment of certain financial objectives and it is implemented through a sequence of transactions involving the financial instruments in an investment portfolio. One such financial objective can be to achieve a maximum expected return over a specific investment horizon for a given level of risk. The invention provides an exchange on a network where a single investment strategy formulated by an advisor (seller) can be seamlessly used for the management of any number of investment portfolios that are maintained in investors' (buyers) personal brokerage accounts. The exchange distributes strategy trade recommendations to investors based on a routine that customizes these recommendations to each investor's personal portfolios. Through its unique framework designed for formulating and distributing financial advice, the exchange significantly lowers the costs associated with delivering financial advice. The exchange can also provide full transparency through the accurate depiction of both the historical performances and projected risk profiles of investment strategies, thus facilitating the identification of investment strategies that best suit investors' financial objectives.

Advisors formulate and distribute financial advice through one or more investment strategies that consist of a sequence of precise trade recommendations delivered to the exchange over a network. These trade recommendations are used to manage hypothetical portfolios. In addition, the exchange can provide personal portfolios to investors as a tool for managing assets held in personal brokerage accounts based on the advice they receive using the exchange. According to one aspect of the invention, these personal brokerage accounts can be maintained outside the domain of the exchange. For a fee, investors can subscribe to any advisor strategy. Over the subscription period, the exchange provides trade recommendations that are based on the selected investment strategy but are customized to the personal portfolios of the investor.

This customization is based on personal portfolio specifications, such as a management weight assigned to subscribed strategies, available cash, history of transactions, and the like. After receiving trade recommendations, an investor can implement any subset of the recommendations by submitting them to a personal brokerage account. Also by subsequently submitting the investment decision to the exchange, an investor allows the exchange to maintain accurate information on the personal portfolio. As a result, the personal portfolio maintained at the exchange precisely reflects the investor's portfolio maintained by the brokerage account. Through the customized trade recommendations, the exchange system assists investors to seamlessly manage a personal portfolio maintained in a brokerage account in a manner consistent with an investment strategy obtained from the exchange.

At the inception of an investment strategy, an advisor defines the initial parameters of the strategy by specifying the starting hypothetical cash balance and a set of restrictions to be imposed on the recommended trades of the strategy during the life of the strategy. These restrictions range from limitations on the type of instruments, such as equities, commodity futures, bonds, or the like, to the type of positions, such as long or short positions. Following the initialization of a strategy, and over the life of the strategy, the advisor submits trade recommendations based on the strategy to the exchange over the network.

The strategy trade recommendations can take the form of precisely defined trade orders submitted to personal brokerage accounts. A trade recommendation can include a description of the opportunity that the trade recommendation is based on. These strategy trade recommendations must be consistent with the initial set of restrictions defined for the strategy. The exchange uses these trade recommendations to manage a hypothetical advisor portfolio corresponding to a given strategy in a manner similar to the way a conventional brokerage firm manages an investor's personal account based on submitted transaction orders. As a result, trade recommendations of a strategy are consistent with the hypothetical holdings of an advisor portfolio that is managed according to a particular strategy. Hence, if an investor held the exact replica of this hypothetical advisor portfolio in a brokerage account then all strategy trade recommendations could be directly submitted to the brokerage account for actual implementation.

By requiring advisors to break down their strategies into precise trade orders, the exchange system can fully evaluate the performance of a hypothetical advisor portfolio that uses a specific strategy. This allows the exchange to record and present accurate historical performance profiles of advisor strategies.

The exchange can also include a risk management tool that allows investors to conduct risk analyses on advisors' strategies based on either their historical performance or their current asset holdings. Investors use this tool during their search for an investment strategy that satisfies personal investment objectives. This analytical tool generates widely used risk measures for each strategy and allows investors to conduct extensive searches. For example an investor can select a subset of available strategies that satisfy various criteria (e.g., strategies that only include large cap stocks) and sort these strategies based on user selected risk measures (e.g., Sharp Ratio). This tool can also recommend financial investment strategies based on the investment objectives defined by the investor. For example, this tool can identify the strategy that maximizes the likelihood of receiving $150,000 in 10 years from an initial investment of $20,000.

The exchange system provides personal portfolios as a tool to investors for managing a personal portfolio of tradable assets, such as equities or fixed income products such as U.S. Treasury Bonds, held in a personal brokerage account based on advisor strategies. In one embodiment of the invention, the assets of personal portfolios are held in personal brokerage accounts outside the domain of the exchange system. However, in an alternative embodiment, this brokerage service can be integrated into the exchange described herein.

Within a conventional mutual fund, advisory and transaction services are bundled. This attribute of mutual funds diminishes the control of investors over the management of a personal portfolio and requires them to follow the advisor's recommendations exactly. In contrast, the exchange disclosed herein can allow the investors to receive concise trade recommendations customized to their personal portfolios, while requiring actual transactions to be conducted by investors through their separate brokerage accounts. This allows investors to gain complete control over the management of personal portfolios. Similar to advisor portfolios, all assets in personal portfolios can be treated as hypothetical in the exchange system. The asset position of a personal portfolio can correspond to the actual holdings of an investor maintained in a separate personal brokerage account. An investor can own multiple personal portfolios.

The initial parameters of a personal portfolio consist of one or more positions in assets and a set of management weights assigned to advisor strategies selected by the investor. These management weights can add up to a number less than one, implying that the investor selects to personally manage a subset of the available funds under a given personal portfolio without relying on advice from the exchange. Assignment of zero management weights implies that the investor selects to personally manage the entire personal portfolio without basing transaction decisions on strategy trade recommendations.

Upon subscribing to a strategy, an investor can assign a positive management weight to this strategy within an existing or a new personal portfolio. Consequently, an investor receives trade recommendations from the exchange customized to each personal portfolio that assigns a positive management weight to the strategy. Once a strategy is given a positive weight within a personal portfolio, an investor initially receives precise trade recommendations that create the current open positions of a strategy within the personal portfolio based on the assigned weight.

Following the initial subscription to a strategy, the investor receives current trade recommendation in regular intervals over a computer network. As an integral part of the investor's investment decision process, the personal portfolio also utilizes a risk management tool that demonstrates the change in the risk return profile of a personal portfolio based on the execution of recommended trades. If the brokerage service is not provided through the exchange then investors can implement any subset of these recommendations by submitting them to their personal brokerage account. Since the asset holdings under a personal brokerage account and a personal portfolio maintained by the exchange must be synchronized, the exchange system permits the investors to notify the exchange over the network about the trade orders submitted to their brokerage accounts. This information can also be used by the exchange for the generation of future trade recommendations, since the customization of recommendations is based on prior implemented trades.

Several advantages of the financial investment advice exchange are:

a) From the advisor's perspective, this invention provides an Internet based environment for creating Virtual Mutual Funds$^{SM}$ which can be viewed as vehicles to sell investment advice in real time without actually conducting financial transactions on an investor's behalf. As a result, the required administrative burden for running a virtual mutual fund is significantly less than running a conventional mutual fund. This results in substantially lower operating costs.

b) The exchange system also provides an efficient real time distribution network for financial investment advice. The exchange allows strategies to be used as tools for distributing advice. A single strategy maintained by an advisor can be used to formulate transactions for any number of investor portfolios.

c) From the investor's point of view, the exchange system provides a platform where personalized investment strategies can be designed and monitored in real time. The exchange lowers the cost of advisory services to the investor while giving them full control over their investment decisions.

d) Investors can easily compare advisor strategies based on either historical or projected return profiles. Since it is widely documented that historical performance is not determinant of future performance, the exchange system provides investors with superior tools for selecting advisors.

The invention also provides an investment advice exchange that has inherent benefits for the distribution of financial investment advice. Compared to traditional newsletters, brokers, and advisors, the exchange system described herein has the following advantages:

a) Independent verification of results from different advisors allows direct comparison among a large range of advisors based on many different criteria.

b) Access to multiple sources of financial advice in one place enables the investor to customize and combine strategies from different advisors to suit the investor's situation.

c) Electronic delivery of advice through a communications network provides more timely and less costly delivery than paper, phone or face-to-face contact.

Many investors are dissatisfied with mutual funds due to high management fees, tax planning issues, and mediocre returns. The exchange system addresses these shortcomings as follows:

a) Tax Efficiency: Recognition of capital gains can be completely managed by the investor, allowing for much greater control over taxes.

b) Market Downturns: The investor can hold on to assets during market downturns. In contrast, mutual funds may face forced liquidations at depressed prices or forced recognition of capital gains during the next market downturn.

c) Transaction Costs: An investor will incur lower transaction costs because the average cost of investment advice can be driven lower, market impact costs are typically much smaller, and commissions and bid-ask spreads are generally comparable.

d) Performance: A larger range of advisors managing smaller asset sizes can provide more opportunity, on average, to significantly outperform the overall market.

Turning now to the drawings, and in particular to FIG. 1, an exchange architecture is illustrated in accordance with an embodiment of the invention. Advisor 1 is a participant interested in formulating and selling financial advice through a number of financial investment strategies. By subscribing to a given strategy, an investor 2 can seamlessly manage a personal portfolio based on the selected investment strategy over a period determined by the term of the subscription.

A financial investment strategy is a sequence of precise trade orders 5 delivered to the exchange 3 by advisors over the network. Based on the specification of investors' portfolios, these orders are translated into investor's portfolio specific precise trade recommendations 6 and sent to subscribed investors 2 by the exchange over the network. Subscribed investors have the option to implement any subset of these recommendations and transmit the list of trades 7 to both their personal brokerage accounts 4 and to the financial investment advice exchange 3. As a result the exchange maintains accurate information on investors' portfolios and uses this information to generate subsequent trade recommendations.

Under this embodiment, the exchange 3 does not partake in the actual execution of trades. All trade transactions take place through personal brokerage accounts held outside the domain of the exchange. The exchange 3 acts as a conduit for disseminating trade recommendations inferred from advisor trades 5 to subscribed investors 2. Precise trade recommendations can be customized based on investors' preferences and the history of implemented trades by investors, thus allowing investors to seamlessly manage personal portfolios based on advisors' investment strategies.

The exchange 3 can be implemented as software executing on a conventional computer, such as a personal computer (PC), workstation, server, or the like. The computer can include a commercially-available operating system (OS) and one or more network cards for communicating with the advisors 1 and investors 2 by way of a communication network, such as the Internet. The software program(s) providing the functionality of the exchange 3 and its components as disclosed herein can be stored in a computer-usable media, such as a hard drive, CD-ROM, solid-state RAM, or the like.

Figure 2:
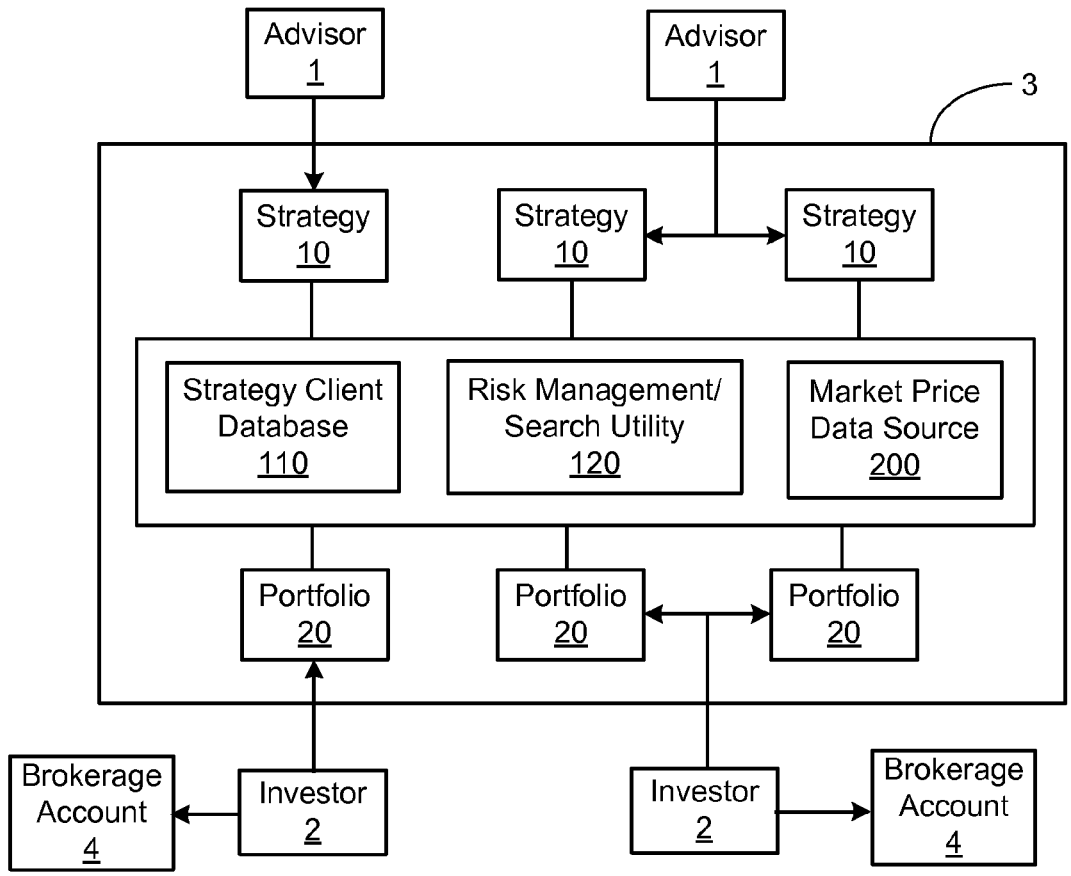
FIG. 2 is a detailed block diagram illustrating the components of the financial investment advice exchange shown in FIG. 1.

FIG. 2 illustrates the components of the financial investment advice exchange 3. The trade recommendations of advisor 1 owned strategies 10 can be incorporated into investor 2 owned personal portfolios (or portfolios) 20. A strategy 10 contains all the information pertinent to a given financial investment strategy. An advisor 1 can maintain any number of strategies 10. Each strategy 10 consists of a sequence of trade recommendations that are consistent with the investment style and objectives specified by the advisor at the inception of the strategy. A more complete specification of a strategy 10 will be discussed in further detail below.

A portfolio 20 is a tool provided to investors for the management of assets held in personal brokerage accounts. An investor can own any number of portfolios 20. An effective use of this tool requires investors to fully reflect the current asset holdings in their brokerage accounts in their personal portfolios 20. A portfolio 20 can correspond to any subset of assets held in a personal brokerage account.

The primary feature of a strategy 10 is its ability to disseminate trade recommendations that are customized to individual portfolios 20 but are based on the trade recommendations of the strategy 10. A portfolio 20 can receive exchange generated customized trade recommendations that are based on recommendations of specific set of advisor strategies. The exchange customizes these strategy trade recommendations based on the portfolio 20 specifications, such as available cash balance, management weights assigned to subscribed strategies and the transaction history. The subscription and trade translation features will be described in further detail below.

Investors 2 can implement these recommendations by directly submitting customized trade recommendations to their personal brokerage accounts 4. By providing trade recommendations that are based on strategy recommendations but are customized to the specification of portfolios 20, the invention allows investors 2 to seamlessly manage assets in their brokerage account 4 based on the trade recommendations of a given investment strategy.

Continuing with the description of the primary components of the exchange in FIG. 2, the strategy client database 110 corresponds to a database that maintains the strategy subscription information. According to one embodiment, the subscription information consists of a unique strategy identifier, a unique investor identifier and the subscription termination date. Once the investor has subscribed to a strategy then, over the subscription term, any portfolio of an investor can obtain portfolio specific trade recommendations. In an alternative embodiment, this scheme can be modified so that an investor is required to individually subscribe personal portfolios to strategies.

The risk management and search utility 120 generates widely used risk measures such as Sharp Ratio, Treynor Ratio, and Value At Risk. These measures can be based on the historical return distribution of a strategy 10 or a portfolio 20. Alternatively, they can be defined based on the historical joint return distribution of either asset prices or the risk factors that determine asset prices, and the current position of assets in a strategy 10 or a portfolio 20. The former set of risk measures are based on historical performance whereas the measures in the latter set correspond to projected risk measures inferred from the current asset composition of a strategy 10 or a portfolio 20. The search utility allows investors to conduct comprehensive searches that may include the above mentioned risk measures as possible search criteria for identifying strategies that best meet personal investment objectives. For example, strategies that satisfy certain criteria (i.e. hold only large cap US stocks) can be sorted based on user specified risk measures (i.e. historical or projected Sharp Ratio).

The market price data source 200 is the source of real time financial instrument prices delivered over a network. The frequency of required market price updates is governed by the predefined restrictions imposed on the distribution interval of trade recommendations. The timing of the process will be described further in the description below.

Figure 3:
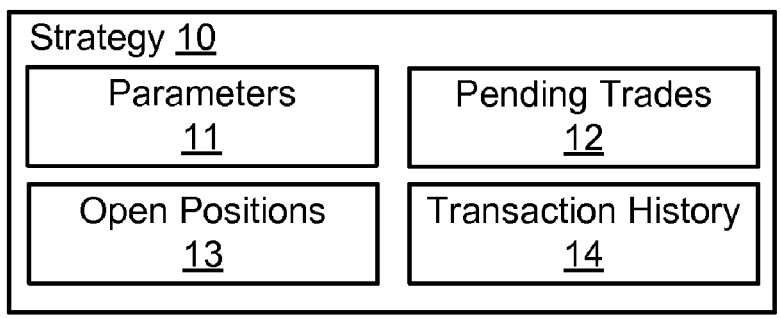
FIG. 3 is a block diagram illustrating the components of a strategy.

FIG. 3 illustrates the components of the strategy 10. The strategy 10 includes strategy parameters 11 that are defined by an advisor 1 at the inception of a strategy. These parameters include, but are not limited to:

a) Initial Investment Amount: This amount specifies the starting hypothetical balance for the strategy.

b) Recommended Minimum Investment: This amount specifies the recommended minimum balance for portfolios 20 that obtain customized trade recommendations based on the strategy.

c) Tradable Financial Instrument Set: This restriction defines the set of instruments that can be traded under a strategy. For example, if a strategy is restricted to include only stocks then this would preclude the strategy from holding a position on stock options or any financial instruments other than stocks. This criterion does not have to be defined within broad instrument categories. It can be further refined. For example, the set can be restricted to include equities that are part of the S&P 500 index or it can include only the fixed income products in a given currency and credit class. In this fashion, a set of tradable instrument categories can be assigned to each strategy.

d) Allowed Position Types: A strategy can be restricted to hold a given position type of instruments specified by the tradable financial instrument set. For example, a strategy can be restricted to never hold any short position in any financial instrument. In an alternative embodiment, for each Tradable Financial Instrument Set, a separate position restriction can be defined. For example, if the strategy can include either equities that compose the S&P 500 and the options on these equities then the strategy can be restricted to include long or short positions for the equities that compose S&P 500 and only long positions for stock options.

e) Restrictions on Cash Transactions: A strategy can be restricted to have any hypothetical cash withdrawal or deposit transactions with the exception of the Initial Investment Amount.

A trade recommendation specifies the terms under which a participant is interested in buying or selling a given financial instrument. For example, a stock trade recommendation includes the name of the financial instrument (i.e. IBM stock), number of shares, price type including value (e.g., market order or limit order at $100, or the like.) and trade type (e.g., buy, sell, sell short, buy to cover, or the like). A trade recommendation must include all the required terms of the transaction based on a given financial instrument traded in a given financial market. The specification of a trade recommendation is financial market specific. In addition, for a trade recommendation to be accepted by the exchange, the corresponding strategy should meet all requirements for conducting this trade. More specifically, the trade recommendation should be consistent with the strategy's parameters 11 and the strategy 10 must hypothetically possess the delivered item of the trade (for example, the cash balance for a purchase or the financial instrument for a sale).

The exchange's management of a strategy 10 or a portfolio 20 can be similar to the process used by brokerage firms in managing a personal brokerage account based on transaction orders provided by the account owner. However, all asset holdings of strategies 10 maintained by the exchange are typically hypothetical and all strategy transactions take place hypothetically. Also, under the preferred embodiment where the brokerage services are not provided by the exchange, all asset holdings of portfolios 20 are hypothetical and all portfolios transactions take place hypothetically.

In FIG. 3, the pending trades list 12 corresponds to all recommended trades submitted by the advisor 1 for which the required market conditions for the completion of the recommended trades have not materialized. Open positions 13 consist of hypothetical current asset holdings under a strategy based on the hypothetical transaction history 14 of the strategy. Open positions also include the hypothetical cash balance that is the sum of available cash for new transactions and the reserved cash required for the hypothetical execution of the pending trades 12. An advisor cannot edit the information content of open positions 13 nor the transaction history 14 of a strategy 10. During certain time intervals an advisor can remove a pending trade from the list of pending trades 12 by canceling the corresponding trade recommendation.

Figure 4:
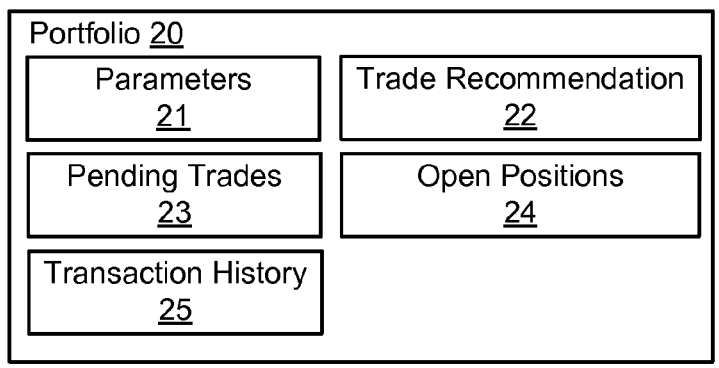
FIG. 4 is a block diagram illustrating the components of a portfolio.

FIG. 4 depicts the components of the portfolio 20 shown in FIG. 2. The portfolio 20 includes parameters 21, trade recommendations 22, pending trades 23, open positions 24, and a transaction history 25. The parameters of the portfolio 21 include strategy management weights. These management weights correspond to weights given to subscribed strategies in originating trade recommendations. The weight information can include a unique strategy identifier and a real number that corresponds to a weight. For a given portfolio, the sum of the weights can be less than or equal to one. The owner of the portfolio can modify these weights at any time. These weights can be set initially and kept fixed during the life of the portfolio.

The portfolio 20 also contains a list of recommended trades 22. The list 22 corresponds to a list of recommended trades that are generated by the exchange based on the trade recommendations of a particular strategy, but are customized to the portfolio 20.

The general functionality of the portfolio pending trades 23, open positions 24, and transaction history 25 is similar to their counterparts within the definition of the strategy 10. Similar to the strategy, all portfolio asset holdings are hypothetical and all portfolio transactions take place hypothetically. An investor can edit the transaction history 25, and thus can indirectly edit the open positions 24 of the portfolio 20. According to one embodiment of the invention, the recommended trades 22 and the pending trades 23 can be merged into a single component. These components and their interaction will be described in greater detail in the subsequent description of the portfolio trade entry process.

Figure 5:
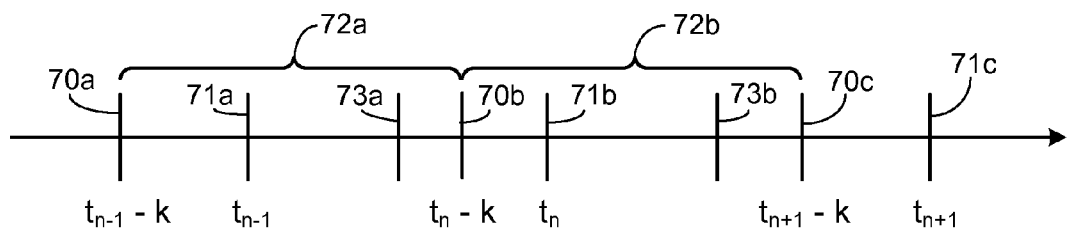
FIG. 5 is a time line illustrating a schedule for collecting strategy trades and distributing trade recommendations.

FIG. 5 illustrates the timing of the process for the gathering of trade recommendations from advisors 1 and the distribution of portfolio trade recommendations to investors 2. Trade orders from advisor 1 are translated by the exchange 3 into recommended trades and then released to investors 2 over discrete time intervals, for example, once a day at a pre-specified time. FIG. 5 illustrates this sequence over two discrete intervals, a and b. By way of example, trades 5 submitted by advisors to the exchange 3 between times $t_{n-1}-k$ and $t_n-k$ (i.e. trade collection period 72a) are distributed to investors at the trade recommendation distribution times 71b $t_n$. Here, k corresponds to an exchange defined lag period that satisfies the restriction $0 \leq k < t_{n+1} - t_n$ for all n. The collection of trades for a certain trade recommendation distribution period 72 terminates at the trade collection deadline 70. The trade collection deadline is defined as a distribution date 71 minus k. A trade that is received during the trade collection period 72a (e.g., $t_{n-1}-k$, $t_n-k$) is not entered into the pending trades list 12 of a strategy until the trade collection deadline 70b $t_n-k$ and not entered into the recommended trade list 22 of a portfolio until the trade recommendation distribution time 71b $t_n$.

The advisors 1 can edit the list of trades prior to their entry on to the pending trades list 12. Advisors are also allowed to cancel trade recommendations listed in pending trades after the trading termination time 73 and before the next trade recommendation distribution time 71. Once a trade recommendation is cancelled, it is removed from the strategy pending trades list 12 and added to the strategy transaction history 14 with a status of cancelled.

All trade translations for a given strategy are done in the same order that the advisor submitted trade orders were received. For example, trade recommendations can be released to investors once a day, one hour prior to the opening time of domestic financial markets. As a result, investors can evaluate the trade recommendations prior to the opening of domestic financial markets. In addition, the exchange 3 can require that all advisor supplied trade orders, which are to be released on a given day, be submitted two hours prior to the opening of domestic financial markets. In this example, k is defined as one hour. Under this embodiment, the time of daily closure of domestic financial markets can correspond to the trade termination time 73.

Figure 6:
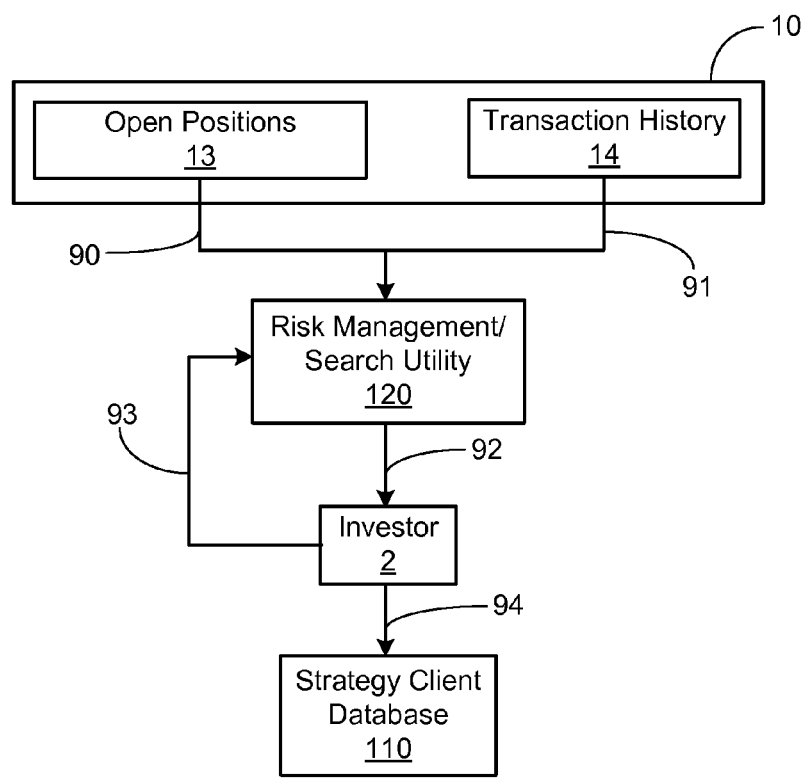
FIG. 6 illustrates a process for subscribing to a strategy from the perspective of an investor.

FIG. 6 illustrates a process for subscribing to one or more of the advisor strategies 10. The open positions 13 of a strategy 10 are the current hypothetical financial instrument holdings, both as assets and liabilities, under a strategy. The open positions can also include the hypothetical cash balance. The market value of a strategy 10 at any given time is defined as the sum of the liquidation value of all positions at the market prices observed at that time. The return from a strategy between two periods is defined as the percent change in its market value, net of any cash infusion or withdrawal, between these periods. The historical performance of a strategy can be demonstrated through various historical return profile measures. For example, the Sharp Ratio over the previous six months is defined as a ratio of average daily returns to standard deviation of daily returns observed over the prior six months. Other measures such as Treynor's Ratio, Value At Risk or various moments of the return distribution can be used to measure the historical return profile of a strategy.

The risk management/search utility 120 produces these risk/return measures for the strategies 10. These measures are based on either the joint return distribution of financial instruments that are hypothetically held by a strategy 10 (i.e. open positions 13) or by the historical return calculation of a strategy based on the transaction history 14 of the strategy 10. The former approach provides a projected risk profile 90, whereas the latter approach corresponds to historical performance 91. An investor 2 can select various criteria 93 including risk/return measures to reflect personal investment objectives. The search utility 120 identifies a set of strategies that satisfy specified criteria by an investor (e.g., strategy can not contain options) and ranks them based on selected risk measures (e.g., projected Sharp Ratio). The risk management/search utility 120 may also identify a strategy 10 that offers the highest probability of achieving an investor's investment objective, such as reaching a target portfolio value of $100,000 in 10 years based on a $10,000 initial investment.

The results of this process are presented to the investor 2 in a report 92. Based on this analysis, the investor 2 may decide to subscribe to a strategy 10 by passing a subscription request to the strategy client database 110. A subscription request 94 includes the strategy identifier, the term of the subscription, and payment information.

Figure 7:
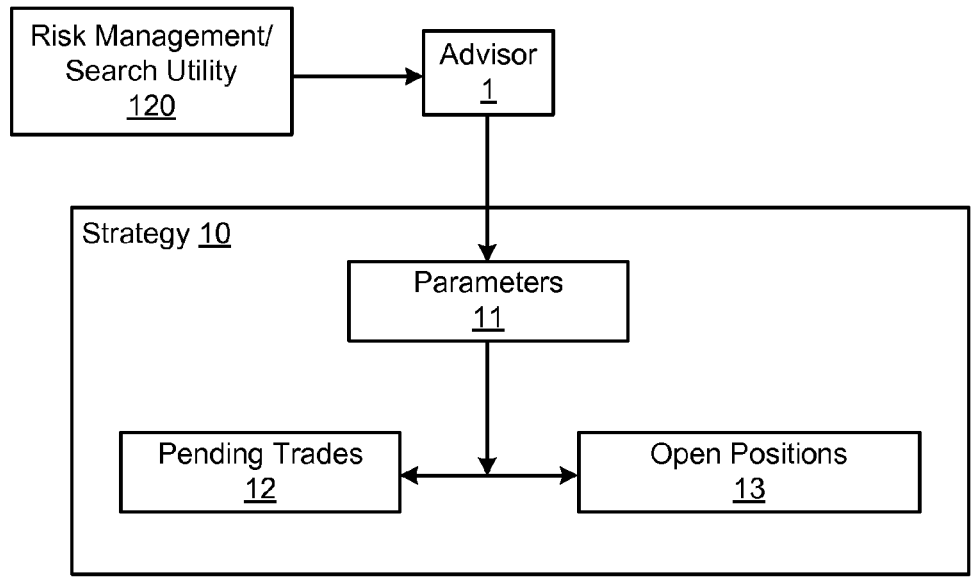
FIG. 7 illustrates a process for entering a strategy trade recommendation.

FIG. 7 illustrates a process for entering strategy trade recommendations. A trade recommendation includes all the required terms of the financial transaction based on a given financial instrument traded in a given financial market. A trade recommendation has one of the following four possible statuses: pending, executed, cancelled or expired. A trade recommendation either opens (i.e. buy or sell short stock trade orders) or closes (i.e. sell or buy to cover stock trade orders) a position.

Each position closing trade recommendation must be tied to a corresponding position opening trade recommendation that has a hypothetical status of executed. Multiple position closing trade recommendations can be assigned to a single position opening trade recommendation as long as the total position closed by the closing recommended trades does not exceed the position opened by the position opening trade recommendation.

Position opening trades result in a hypothetical outflow of a certain cash amount in exchange for the hypothetical new position whereas position closing trades result in hypothetical cash inflow in exchange for the hypothetical removal of the position (i.e. sale of financial instruments). In this context, the reserve requirement for a stock short sale can be viewed as cash outflow since the reserved amount cannot be used for opening positions.

The requirements imposed by the strategy 10 for entering a trade recommendation or for the portfolio for entering a trade are similar to the requirements used by brokerage accounts for accepting trade orders. The open component of an executed opening trade corresponds to the component of the position not closed through executed closing trades tied to this opening trade. An uncovered component of an executed opening trade corresponds to the component that is neither closed by an executed closing trade tied to this opening trade nor scheduled to be closed by a current pending closing trade tied to this opening trade.

Turning now to the process of FIG. 7, an advisor submits trade recommendations 40 to the exchange over the network. The exchange provides a risk management/search utility 120 that assists advisors in designing strategy trade recommendations. During the design of a trade recommendation, this utility demonstrates to the advisor the change in a strategy's projected risk profile following the hypothetical execution of any recommended trade 44. Each recommended trade should be consistent with the parameters 11 of the given strategy. At the trade recommendation deadline, all recommended trades that are submitted to the exchange 3 over the prior trade collection period are entered into the strategy pending trades list 12 with a status of pending 42 and open positions 13 are adjusted 43 to reflect the resources reserved for the hypothetical execution of the pending trade. In the case of position opening trades, as each recommended trade is added to the pending trades list 12, the hypothetical available cash balance under the open position 13 of a strategy is reduced by the hypothetical cash outflow that would result due to the hypothetical execution of the recommended trade.

In the case of position closing trades, the information on the uncovered component of the opening trade is updated to reflect the creation of a new closing trade that is tied to this position opening trade.

Figure 8:
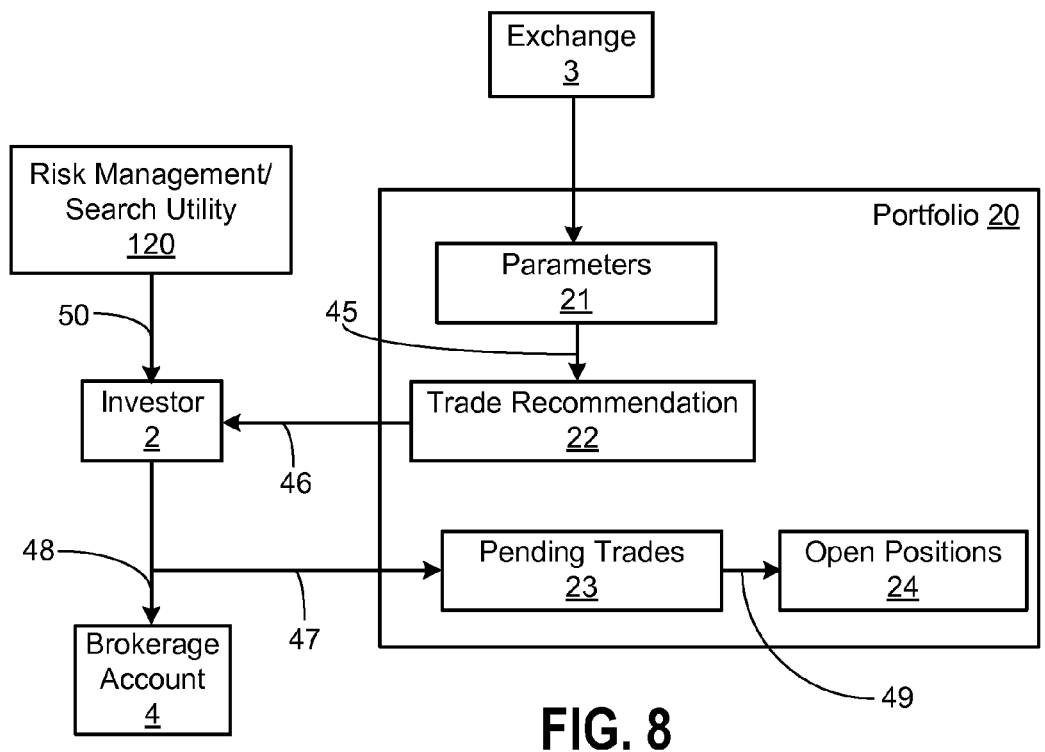
FIG. 8 illustrates a process for entering a portfolio trade.

FIG. 8 illustrates a process for entering portfolio trades and for translating strategy trade recommendations into customized portfolio trade recommendations. The source of a portfolio trade corresponds to the originator of the trade idea. A portfolio trade can have one of two possible origination sources: 1) a strategy trade recommendation or 2) the investor 2 who owns the portfolio 20. Portfolio management weights determine the ratio of available resources invested in each subscribed strategy. The role of the management weights is described in further detail below in connection with the strategy trade recommendation translation process that uses these weights to define customized portfolio trade recommendations. If the sum of the management weights is less than one, then the investor can manage a portion of the portfolio based on a personally defined strategy. Under this scenario, an investor 2 can enter position opening trades that specify the investment strategy for a personally defined strategy. In addition, an investor has the ability to create position closing trades. These investor generated position closing trades can be tied to hypothetically executed position opening trades that are based on either a recommended trade strategy or the personal strategy of the investor. In sum, the investor can close any position held under the portfolio 20.

Following the translation of strategy recommendations into portfolio recommendations, the customized portfolio trade recommendations are delivered 45 to the investor 2 during the trade recommendation distribution periods. The investor 2 can view the portfolio specific trade recommendations through the trade recommendation list 22 of a portfolio 20. The investor 2 examines these filtered recommendations 46. The exchange 3 provides the risk management/search utility 120 that demonstrates the change in the projected risk profile of the portfolio if a certain subset of trade recommendations are implemented 50. Based on this analysis, the investor 2 can decide on the subset of trade recommendations that he/she would like to implement and sends the corresponding trade orders to both his/her personal brokerage account 48 and to the exchange 47. By accepting a trade recommendation, the investor 2 moves a trade from the trade recommendation list 22 into the pending trades list 23. Alternatively, all recommended portfolio trades can be entered directly into the pending trades list 23. This would imply that investors automatically accept all trade recommendations and submit them to their brokerage accounts 4. According to this embodiment, the trade recommendation 22 component of a portfolio 20 would be removed from the portfolio specification.

An investor can reject a trade recommendation and remove the recommendation from the trade recommendation list 22. As described previously, the advisor 1 is allowed to cancel strategy pending trades during certain intervals. All recommended trades of a portfolio that are based on a cancelled recommended trade of a strategy would be automatically removed from the trade recommendation list 22 of a portfolio 20. An investor 2 can add personal trade orders to the list of trade orders submitted to the exchange 47 and to a personal brokerage account 48. These investor originated trades should be consistent with the above-defined restrictions for the investor-originated trades. In this manner, the pending trades 23 of a portfolio can fully reflect the pending trades of an investor's personal brokerage account.

The exchange 3 may have a direct link with the provider of the brokerage service, thus allowing the trade information to be automatically synchronized between the exchange 3 and the brokerage account 4. The specification of accepted trades 47 submitted by an investor 2 also includes the source of the trade. Each portfolio transaction under pending trades 23, transaction history 25 and open positions 24 includes the source information. Similar to the procedure followed by the strategy trade entry process, open positions 24 are adjusted following each new entry to the pending trade list 23 to reflect the resources reserved for the hypothetical execution of the pending trade 49.

Under the preferred embodiment, the exchange 3 uses the following steps to translate strategy trade recommendations into customized portfolio trade recommendation. Upon subscribing to a strategy 10, the exchange 3 provides portfolio specific trade recommendations to each of the portfolios 20 of an investor 2 that assigns a positive strategy weight to the given strategy 10. These initial trade recommendations are designed to replicate the strategy's current holdings of financial instruments based on current market prices of financial instruments. The following set of steps illustrates the rule-based approach for generating portfolio trade recommendations based on the open positions of a strategy.

```
STEP 1: Identify the market value of each position held under the strategy
    FOR {Each Open Position of Strategy}
        Market Value of the Position =  Amount Required to Open the
                                        Strategy Position under the
                                        Current Market Price of the
                                        Instrument;
    NEXT
STEP 2: Identify the ratio of the market value of each position to the total
    market value of all positions held under the strategy
    FOR {Each Current Position of Strategy}
        Strategy Ratio of the Position =  Market Value of the Strategy
                                          Position/Sum of Market Value
                                          of All Strategy Positions;
    NEXT
STEP 3: Identify the number of units of a financial instrument that the
    portfolio needs to hold to replicate the current position of a strategy
    in this financial instrument based on an assigned strategy weight and
    the available cash balance of the portfolio for opening new positions
    (the cash reserved from pending trades is excluded)
    Available Portfolio Cash = Available Cash of the Portfolio * Assigned
                               Weight to the Strategy By the Portfolio;
    FOR {Each Strategy Open Position Excluding Cash}
```

```
        Cost Per Unit = Amount Required to Open a One Unit of the Posi-
tion
                        under the Current Market Price of the Instrument;
        (e.g., if the position is a long position in a stock then cost per unit
        corresponds to a current value of one share of the stock)
        Recommendation Unit = (Available Portfolio Cash * Strategy Ratio
                        of the Position)/Cost Per Unit;
        Recommendation = Full Specification Of A Trade Required To
                        Immediately Open A Portfolio Position That is Identical To
                        The Corresponding Position Of The Strategy With Units
                        Equal To Recommendation Unit;
        (e.g., if it is a long position in a stock then the recommendation is: buy
        Recommendation Unit shares of the stock at market price)
            Warning = Do not Spend More Than (Available Portfolio Cash *
                        Strategy Ratio of the Position) For Conducting This Trade;
        (This warning allows investors to adjust the Recommendation Unit if
        the Cost Per Unit changes between the recommendation delivery and
        the trade implementation)
    NEXT
END
```

A subscription to a strategy also allows investors to view portfolio specific trade recommendations that are inferred from the new strategy trade recommendations submitted to the exchange 3 over a pre-specified period determined by the term of the subscription. The following set of steps illustrates the rules-based approach for generating portfolio trade recommendations based on new strategy trade recommendations.

```
IF {Strategy Trade Recommendations Is A Position Opening Trade}
    Strategy Trade Ratio =  Required Cash Payment For the Strategy
                            Trade Recommendation/Available Cash
                            Balance Under the Strategy;
    Available Portfolio Balance = Available Cash Of the Portfolio *
                            Assigned Weight to the Strategy
                            by the Portfolio;
    Cost Per Unit = Amount Required to Open One Unit of the Position
                    under the Trade Price of the Instrument;
    Recommendation Unit = (Available Portfolio Balance * Strategy Trade
                    Ratio)/Cost Per Unit;
ELSE IF {Strategy Trade Recommendations Is A Position Closing Trade}
    AND {Portfolio Trade Recommendation, that is Based on the Position
    Opening Strategy Trade that This Strategy Trade Recommendation is
    Closing, is Executed}
    Uncovered Portion of the Position Opening Strategy Trade = Portion of
        the Opening Strategy Trade (That This Closing Trade is Tied To)
        That is Not Covered By An Executed or Pending Closing Strategy
        Trade Tied To This Position Opening Trade;
    Uncovered Portion of the Position Opening Portfolio Trade = Portion of
        the Opening Portfolio Trade (For Which the Above Position
        Opening Strategy Trade Is The Source) That is Not Covered By
        Either An Executed or Pending Closing Portfolio Trade Tied To
        This Position Opening Trade;
    Strategy Trade Ratio = Units of the Instrument To Be Traded By The
                            Source Strategy Trade/Uncovered
                            Portion of the Position Opening Strategy
                            Trade;
    Recommendation Unit = Strategy Trade Ratio * Uncovered Portion of
                            the Position Opening Portfolio Trade;
END IF
Trade Recommendation = Full Specification Of the Strategy Trade
                        Recommendation With Trade Units
                        Replaced With Recommendation Unit;
```

Figure 9:
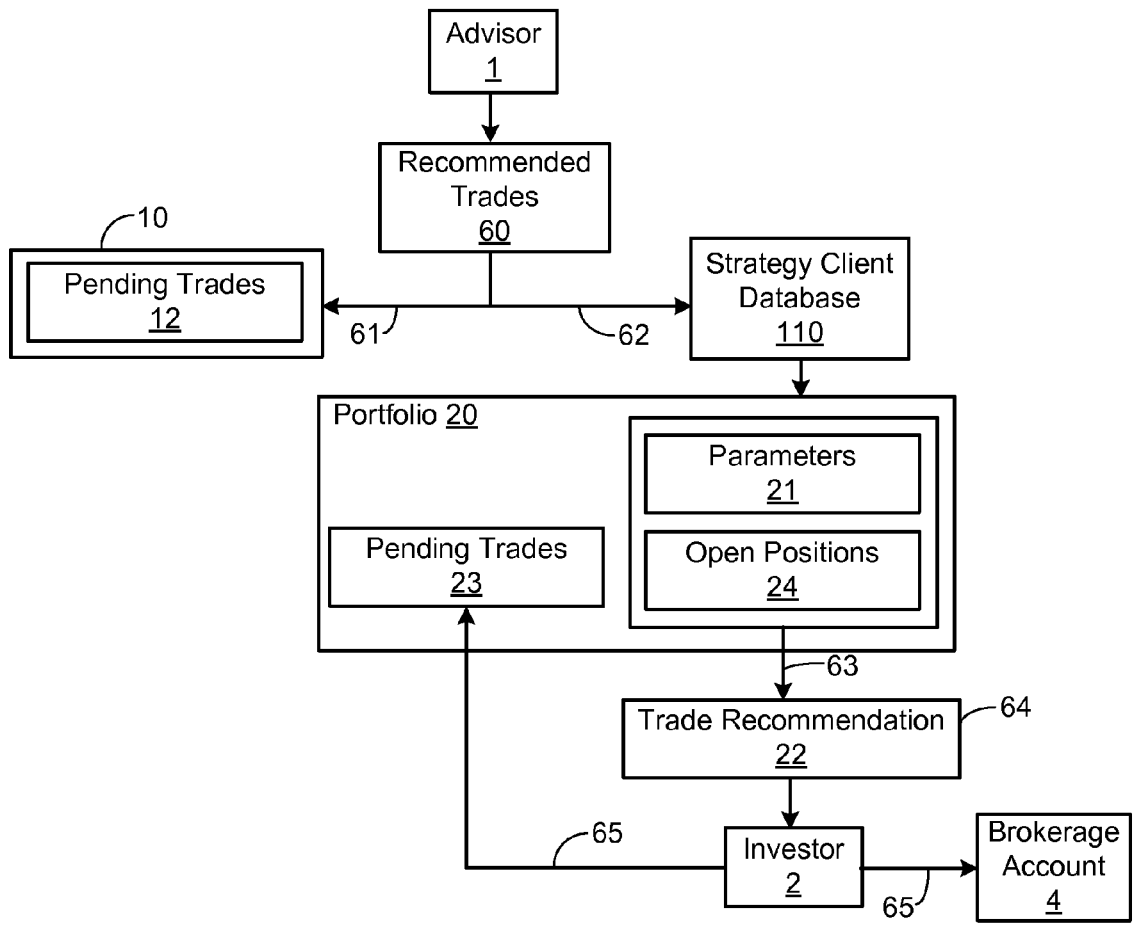
FIG. 9 illustrates a trade translation process.

FIG. 9 illustrates the trade translation process based on the conversion of a strategy trade recommendation into a portfolio specific trade recommendation according to a portfolio's parameters 21 and open positions 23. An advisor 1 submits a strategy specific trade recommendation 60 over the network. This trade recommendation is added to the pending trades list 12 of the strategy 10 at the first trade collection deadline subsequent to the submission of the trade recommendation. The process uses the Strategy Client Database 110 to determine the list of investors and their portfolios that have assigned a positive weight to this strategy. For these portfolios 20, the translation process 63 uses the parameters (i.e. strategy weights) 21 and open positions 23 to generate portfolio specific trade recommendations 64. The specific rules of this trade translation process are already described above. The investor 2 views the recommended trades 64 and may decide to either implement or ignore these trade recommendations. By accepting the trade recommendation, the investor 2 adds these recommended trades to the pending trades 22 of the portfolio 20. This addition to the pending trades list can be manually sent 65 to the brokerage account 4 of the investor 2 by the investor 2. In an alternative embodiment, a direct network connection between the exchange 3 and the brokerage service provider would allow the pending trade list under the brokerage account and portfolio 20 held within the exchange to be automatically synchronized.

Using the exchange 3, a single financial investment strategy can be used to deliver portfolio specific trade recommendations to any number of portfolios. Similarly, an investor can receive trade recommendations for a single portfolio that originate from a multitude of strategies.

Figure 10:
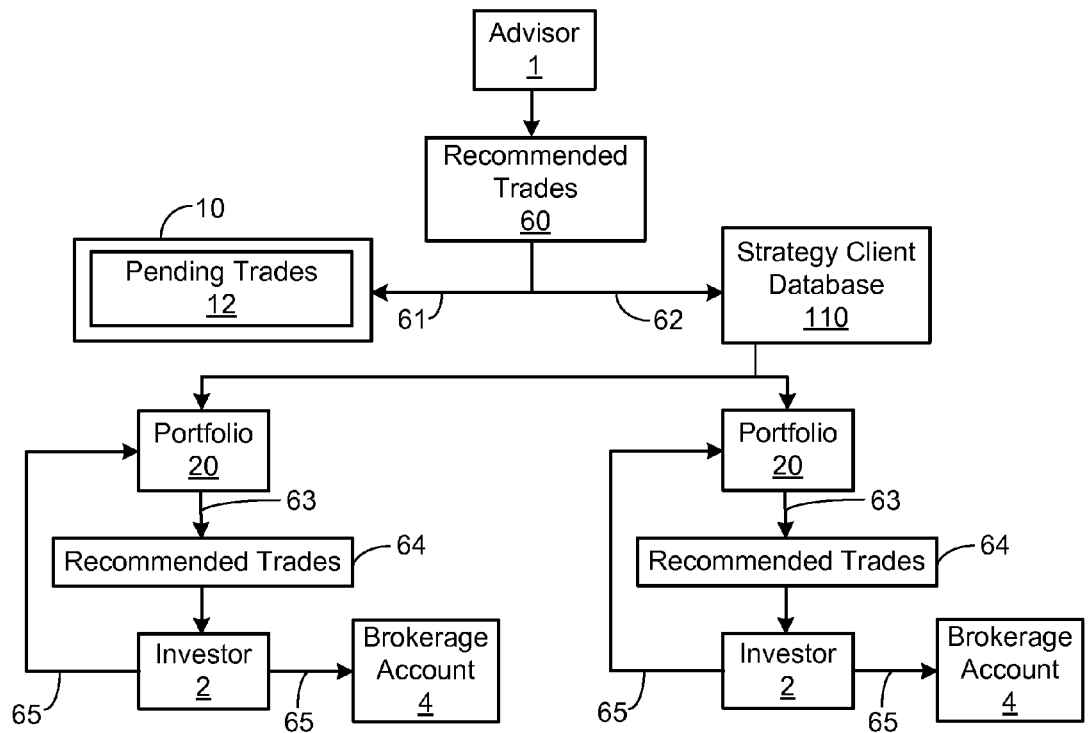
FIG. 10 illustrates a process for transferring strategy from advisor to multiple investors.

FIG. 10 illustrates the trade translation process with multiple portfolios 20 receiving trade recommendations from a single strategy 10. An advisor 1 provides strategy trade recommendations that are added 61 to the strategy pending trades list 12. At each trade recommendation distribution period, the exchange 3 uses the strategy client database 110 to identify investors who have subscribed to the given strategy. Consequently, the exchange 3 creates a list of portfolios of the investors' that assign positive management weights to this strategy 10. The exchange 3 then sequentially translates 63 the strategy trade recommendations into customized portfolio trade recommendations based on the parameters of each such portfolio 10. Each investor views 64 the customized precise portfolio trade recommendations that are based on the given strategy's trade recommendations and are consistent with the historical transactions of each such portfolio 20. Each investor 2 can select to implement any subset of the recommended trades submitted by the exchange 3. Each investor 2 submits 65 the selected trade recommendations to a personal brokerage account 4 for implementation. Consequently, each investor submits 66 the information on the executed trades (e.g., execution price) to the exchange 3. This allows the exchange to maintain accurate information on each portfolio. In this manner, the exchange 3 allows a single strategy maintained by an advisor to provide customized trade recommendations to any number of subscribed investors' portfolios.

Figure 11:
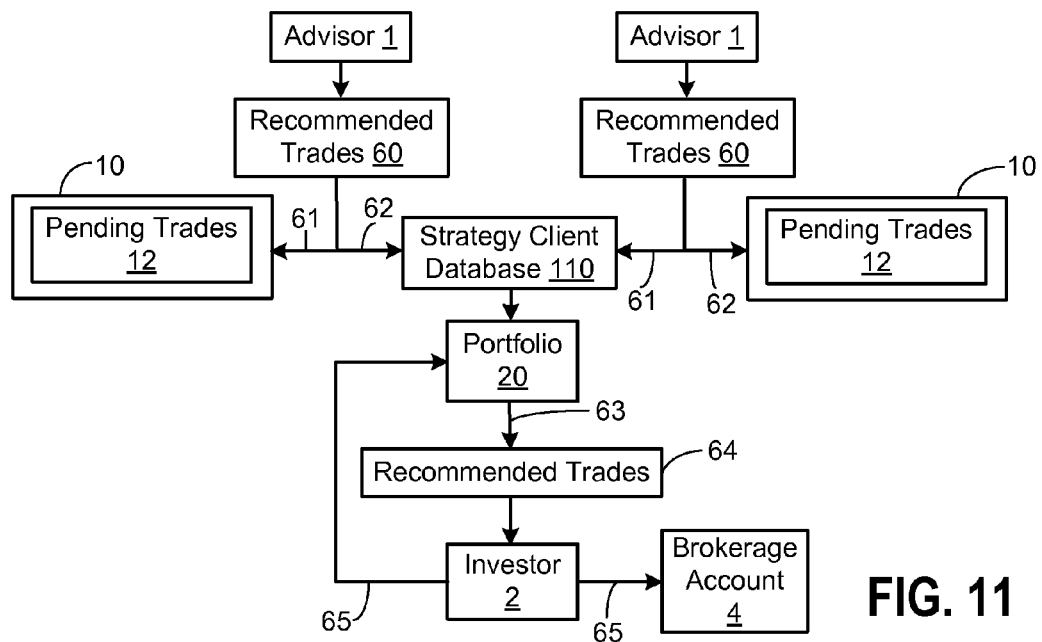
FIG. 11 illustrates integration of strategies from multiple advisors into an investor portfolio.

FIG. 11 illustrates the process where a single portfolio 20 receives trade recommendations from multiple strategies 10. Through the specification of management weights, a portfolio 20 can be structured to depend on multiple strategies. In this example, a portfolio is specified to depend on two different strategies that may be managed by two distinct advisors 1. Advisors 1 submit 60 the trade recommendations to the exchange 3. At each trade recommendation distribution period, the strategy client database 110 identifies the list of portfolios owned by investors who have subscribed to each strategy 10. Consequently, for each portfolio that assigns a positive management weight to the given strategy, the exchange 3 creates a list of customized precise portfolio trade recommendations. In a single portfolio, the investor 2 can view the trade recommendations based on multiple strategies and select to implement any subset of these recommendations by submitting 65 the trade orders to a personal brokerage account 4. Consequently, the investor 2 submits 66 the execution information on the selected trades to the exchange 3.

Figure 12:
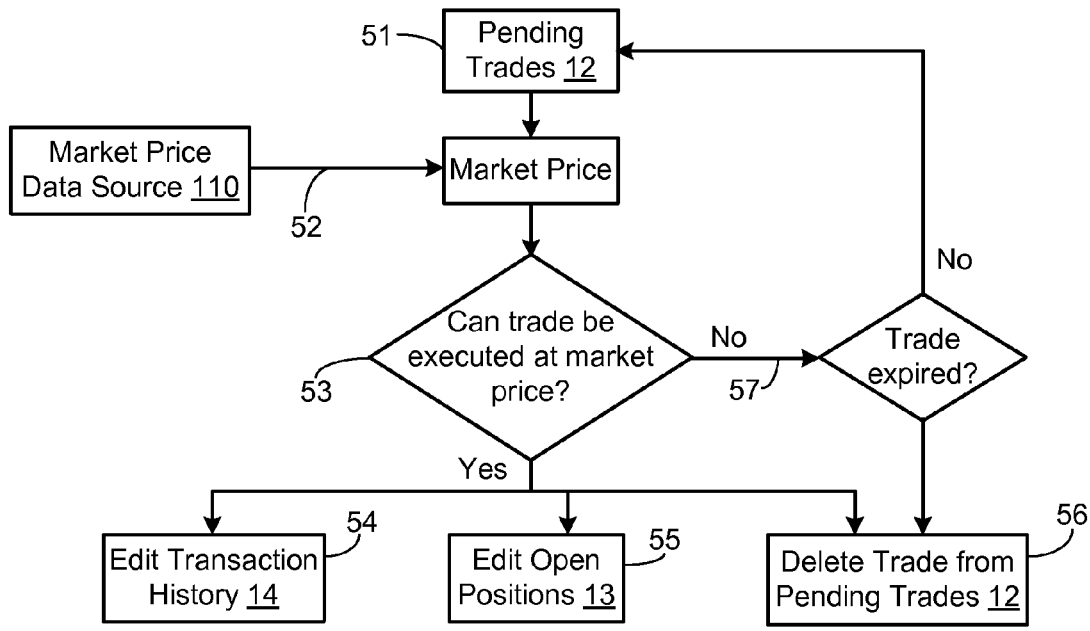
FIG. 12 illustrates a process for transferring strategy recommended trades from strategy pending trades to a strategy transaction history.

FIG. 12 illustrates a process for transferring strategy pending trades from pending trades 12 to transaction history 14. This process can be executed at each trading termination time. The process starts by obtaining pending trades 51 of a strategy 10. Consequently, the process receives market prices 52 from the market price data source 200. The process then sequentially checks each trade recommendation in the pending trade list 12 of a strategy 10. If the strategy trade recommendation can be hypothetically executed under the observed market prices between the previous trade distribution period and this trading termination period (i.e. a limit price is reached) then the trade recommendation is recorded as hypothetically executed. The process records this execution by moving the trade recommendation to the transaction history 54 with a status of executed. Next, the open positions 13 are adjusted to incorporate the executed recommended trade 55 and the recommended trade is removed from the pending trades list 56. This process does not include the actual execution of a trade. Rather it determines whether a trade could hypothetically be executed under the current market prices. If the recommended trade is not executed 57, then the exchange checks to see whether the recommendation has expired. If the trade recommendation has not expired then it remains in the pending trades list 12. All expired trades are removed 56 from the pending trades list 12 and the open positions 13 are adjusted to reflect the availability of resources previously reserved for the execution of the expired pending trades. Accordingly, all trade execution information for the recommended trades, including the execution price, is generated by the exchange 3. The control of an advisor 1 over the trade recommendations is limited by the ability to cancel a recommended trade that resides in the pending trades list 12 between the trade termination time and trade collection deadline. Besides this feature, the advisor 1 cannot modify any information stored under transaction history 14, the open positions 13 and the pending trades 12 of the strategy 10.

Figure 13:
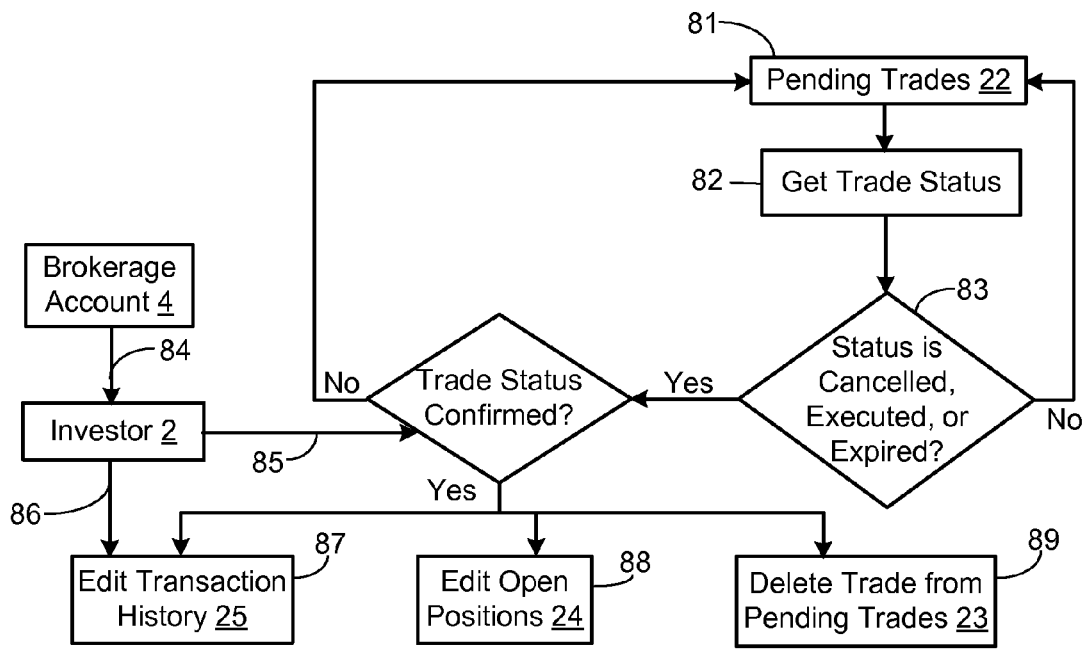
FIG. 13 illustrates a process for transferring the portfolio trades from portfolio pending trades to a portfolio transaction history.

FIG. 13 illustrates a process for transferring portfolio pending trades from pending trades 22 to transaction history 25 of the portfolio 20. A pending portfolio trade is either based on a strategy trade recommendation or created by the investor. These sources determine the method used for deriving the status of the portfolio pending trade (step 82). If the source of the portfolio pending trade is a strategy trade recommendation, then the status of the source strategy trade is used to define the status of the portfolio trade recommendation. On the other hand, if the source of the portfolio pending trade is the investor, then the investor created portfolio pending trades have the status of pending. The execution status of the investor created portfolio pending trades can be checked through a process similar to the one described in FIG. 12 for the strategy pending trades.

A pending portfolio trade can have a status of executed, cancelled, pending or expired. Although trade statuses are generated by the exchange 3, they are editable by the investor 2. The investor 2, based on the information obtained from his/her brokerage account 4, submits the information 85 on the status of trades and the confirmation of these statuses to the exchange 3. To move a trade from the pending trades list 23 to the transaction history 25, the investor 2 is required to confirm the status of the trade that is cancelled, executed or expired. All pending trades with a non-confirmed status or a confirmed pending status are kept in the pending trades list 23. Pending trades with a confirmed cancelled or confirmed expired status are removed from the pending trades list 23, and the portfolio open positions 24 are adjusted to reflect the availability of resources reserved for the hypothetical execution of these pending trades. If the trade has a confirmed executed status then the investor can submit the execution price and date information to the exchange 3 if the default values for these variables do not correspond to the execution price and date information obtained from the brokerage account 4. Confirmed executed trades are added 87 to the transaction history 25 and are removed from the pending trades list 23. In addition, open positions 24 are adjusted to reflect the change in the portfolio holdings based on the hypothetical execution of the trade at the specified market price. Alternatively, the information maintained by the brokerage account 4 and the exchange 3 can be automatically synchronized through a direct network connection between the exchange and the brokerage account. Under this arrangement, all pending trade information can be updated automatically based on the execution information maintained by the brokerage account 4 without a need for a status confirmation by the investor 2.

According to one embodiment of the invention, brokerage services can be included in the services provided by the exchange 3. Under this embodiment, a subset or all of the investor portfolios within the exchange 3 would correspond to an actual brokerage account 4 and the synchronization of personal portfolios 20 within the exchange 3 and the portfolios held in a brokerage account 4 would be automatic. In contrast to the architecture shown in FIG. 1, the brokerage accounts 4 would reside within the domain of the exchange 3.

Figure 14:
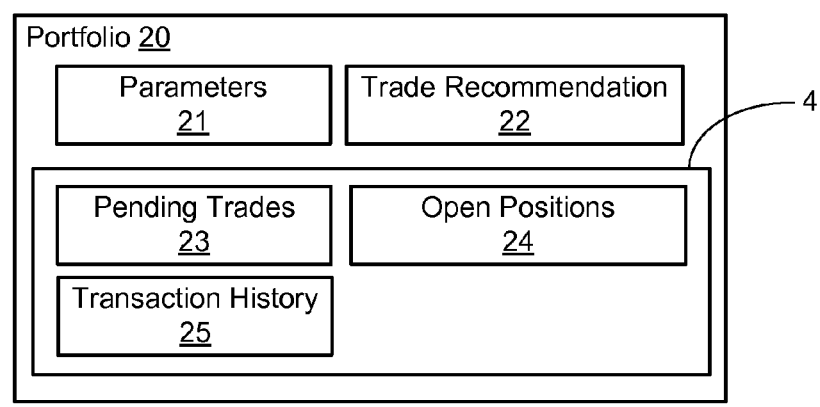
FIG. 14 illustrates the components of a portfolio when the exchange provides brokerage services to investors.

FIG. 14 illustrates the content of the brokerage account within the definition of a portfolio if the brokerage service is provided by the exchange 3. The pending trades 23, open positions 24 and transaction history 25 would all reside within the brokerage account maintained by the exchange 3.

Figure 15:
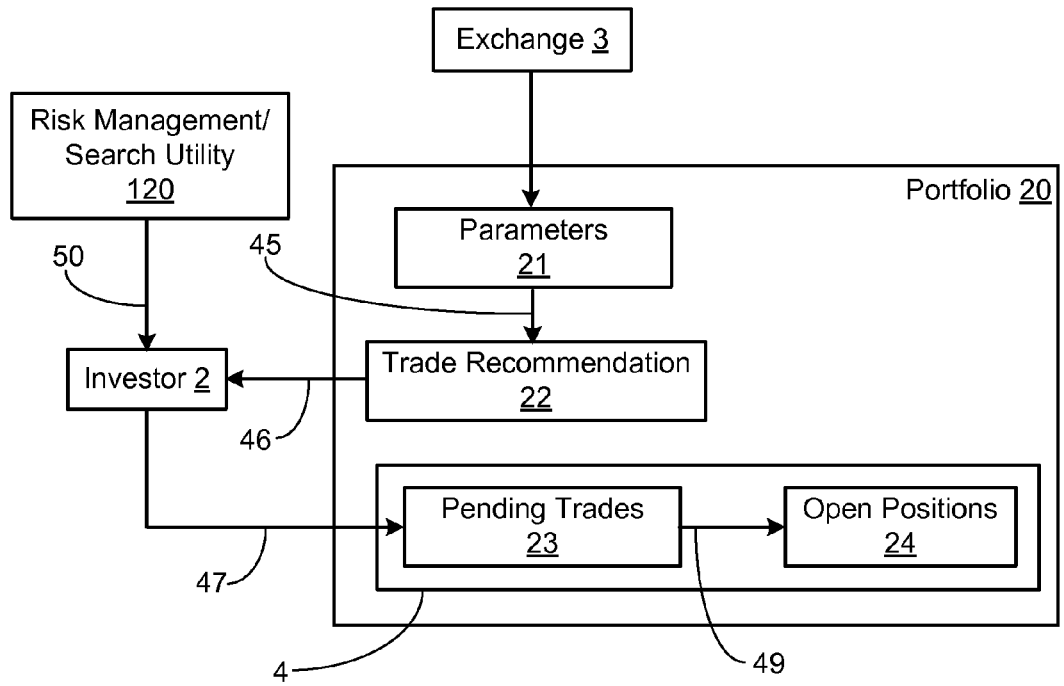
FIG. 15 illustrates the process for entering a portfolio trade wherein an exchange is configured to provide brokerage services to investors in accordance with an alternative embodiment of the invention.

FIG. 15 shows a process for entering portfolio trades when the brokerage service is provided by the exchange 3. Similar to the process described in FIG. 8, the exchange 3 submits trade recommendations to the investor for evaluation 45. An investor 2 examines the recommendations 46, and submits them 47 to the pending trades list 23 that resides within the brokerage account.

Figure 16:
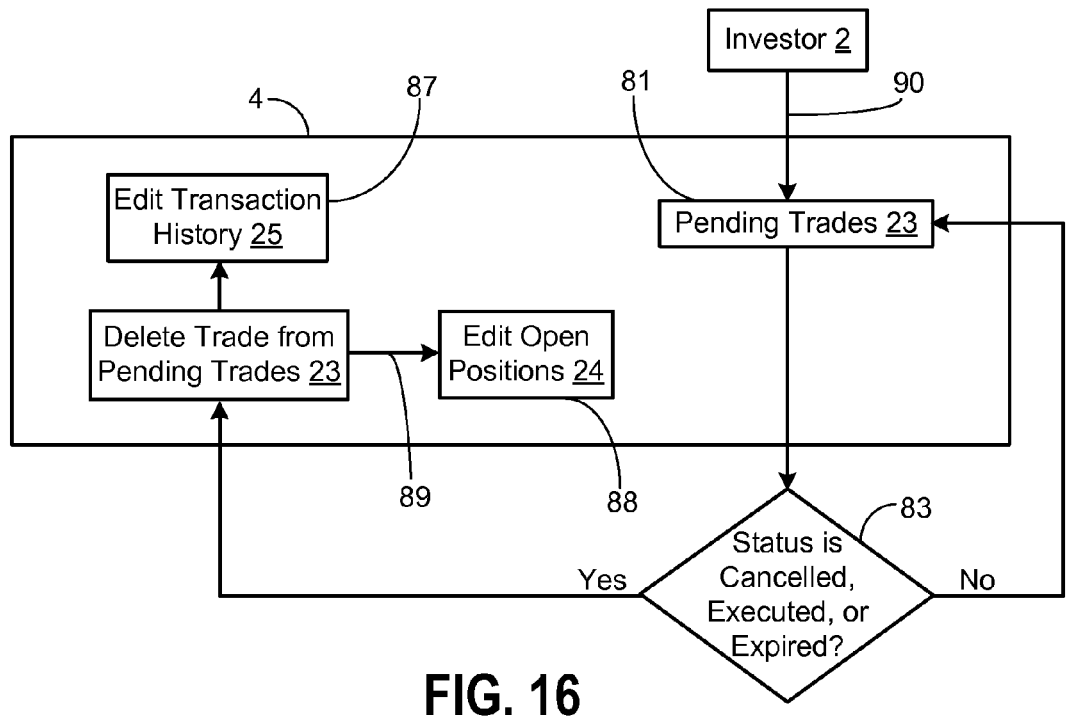
FIG. 16 illustrates a process for transferring portfolio trades from portfolio pending trades to a portfolio transaction history wherein an exchange is configured to provide brokerage services to investors.

FIG. 16 shows the process for transferring portfolio pending trades 23 to transaction history 25 when the brokerage service is provided by the exchange 3. Similar to the process used by the brokerage service provider, an investor can cancel 90 the pending trades prior to the realization of market conditions that trigger their execution. All cancelled, expired or executed trades are deleted from the pending trades 23. In addition, the execution statuses of these trades are reflected in the transaction history 25 and open positions 24 of the portfolio 20.

Each position opening trade may include a specification of a market condition -when the exchange 3 stops providing customized portfolio trade recommendations that replicate the resulting open positions under a strategy for new subscribers of the strategy. For example, a position opening buy order for 100 shares of IBM stock may include a market condition that suggests replicating this position while the IBM stock price is less than $50. If the market price of an IBM stock is $60 on the day an investor subscribes to this strategy, then this position will be ignored when a set of trade recommendations that replicate the current position of this strategy are generated by the exchange 3. By ignore it is meant that the true market value of the position will be used for the calculation of the sum of the market value of all strategy positions and the position will be assigned a strategy ratio of the position of zero at STEP 2 of the rules-based approach for generating portfolio trade recommendations based on the open positions of a strategy.

The portfolio management weights are defined at the initialization of a personal portfolio 20 and can vary during the life of the portfolio 20. Alternatively, portfolio management weights can be restricted to be either one or zero and also invariant during the life of the portfolio 20. This would imply that a portfolio 20 is managed based only on a single strategy 10 or only by the personal investment strategy of the investor 2.

Strategy trade recommendations may be activated by the exchange 3 when advisor 1 defined market conditions are realized at any time prior to the trade collection deadline that immediately precedes the desired trade distribution date for the trade. These trade recommendations would be submitted to investors during the next distribution period. For example, in FIG. 5, a buy order at market price for 100 shares of IBM can be structured so that if the S&P 500 Index reaches a certain level during the interval $(t_n-k, t_{n+1}-k)$ then the trade recommendation is added to the pending trades list 12 of a strategy at period $t_{n+1}-k$ and distributed to investors at $t_{n+1}$. Similarly, a strategy trade recommendation can be structured such that certain attributes of the trade order that are distributed to investors 2 at $t_{n+1}$ can be identified using a predefined relation between the observed value of a market variable during the interval $(t_n-k, t_{n+1}-k)$ and the trade attributes. For example, a buy limit order can be structured to have a limit price of IBM's market price observed at a specific point in the interval $(t_n-k, t_{n+1}-k)$ minus $2.

The control the investor has over the certain investment strategies may be limited by the exchange 3. The exchange may not require confirmation of the trade recommendations submitted to portfolios 20.

While specific embodiments of the present invention have been shown and described, it will be apparent to those skilled in the art that the disclosed invention may be modified in numerous ways and may assume many embodiments other than those specifically set out and described above. Accordingly, the scope of the invention is indicated in the appended claims, and all changes that come within the meaning and range of equivalents are intended to be embraced therein.

What is claimed is:

1. A system for providing investment advice to investors over a computer network, comprising:

means for receiving a plurality of investment strategies from a plurality of investment advisors, each of the investment strategies being updated periodically and including a plurality of trade recommendations, wherein each of the trade recommendations specifies a financial instrument and terms necessary for trading the financial instrument in a respective financial market;

means for subscribing to the investment strategies;

means for entering one or more investor-defined management weights by way of the computer network;

means for applying the investor-defined management weights to the investment strategies thereby generating a weighted portfolio of trade recommendations, the management weights defining the percentage of investor portfolio funds available for investing in the investment strategies;

means for delivering the weighted portfolio of trade recommendations to the investor over the computer network during a trade recommendation distribution period;

means for accepting, rejecting or modifying each of the trade recommendations of the weighted portfolio of trade recommendations by the investor, through the computer network, thereby producing a sequence of customized trade recommendations;

means for entering, by way of the computer network, one or more investor trades based on an investor-defined strategy, each of the investor trades specifying a financial instrument and terms necessary for trading the financial instrument in a respective financial market; and means for submitting the sequence of customized trade recommendations and the investor trades to a separate investor brokerage account for execution.

2. The system of claim 1, wherein at least one of the investment strategies includes at least one parameter selected from the group consisting of an initial investment amount, a recommended minimum investment, a tradable financial instrument, a set of allowed position types, and restrictions on cash transactions.

3. The system of claim 1, further comprising:
means for executing a plurality of trade transactions based on the sequence of customized trade recommendations.

4. The system of claim 1, further comprising:
means for updating the investment strategies at predetermined intervals.

5. The system of claim 1, wherein each of the trade recommendations specifies a price type.

6. The system of claim 1, wherein each of the trade recommendations specifies a trade type.

7. The system of claim 1, wherein the means for subscribing to the investment strategies includes:
means for comparing historical or projected returns of the investment strategies;
means for selecting at least one of the investment strategies based on the comparison of historical or projected returns; and
means for subscribing to the at least one of the investment strategies.

8. The system of claim 1, further comprising:
means for defining and storing within the system initial parameters for each of the investment strategies, wherein the initial parameters include an initial investment amount, a recommended minimum investment amount, a tradable financial instrument set, and allowed position types.

9. A method of providing investment advice to an investor, comprising:
receiving over a computer network a plurality of investment strategies from a plurality of investment advisors, each of the investment strategies being updated periodically and including a plurality of trade recommendations, wherein each of the trade recommendations specifies a financial instrument and terms necessary for trading the financial instrument in a respective financial market;
maintaining a subscription to the investment strategies for the investor using a strategy client database;
receiving from the investor, by way of the computer network, one or more investor-defined management weights, the management weights defining a percentage of investor portfolio funds available for investing in each of the investment strategies;
generating a weighted portfolio of trade recommendations by applying the investor-defined management weights to the investment strategies;
delivering the weighted portfolio of trade recommendations to the investor over the computer network during a trade recommendation distribution period;
selecting a subset of trade recommendations from the weighted portfolio of trade recommendations based on a risk measure sing an investor-accessible search utility;
receiving from the investor, through the computer network, an acceptance, rejection, or modification of each of the trade recommendations included in the subset of trade recommendations;
producing a sequence of customized trade recommendation based on the received investor acceptance, rejection, or modification of each of the trade recommendations included in the subset of trade recommendations;
receiving from the investor, by way of the computer network, one or more investor trades based on an investor-defined strategy, each of the investor trades specifying a financial instrument and terms necessary for trading the financial instrument in a respective financial market; and
submitting the sequence of customized trade recommendations and the investor trades to a separate investor brokerage account for execution.

10. The method of claim 9, further comprising:
providing the plurality of trade recommendations to a brokerage account.

11. The method of claim 10, further comprising:
executing a plurality of trades based on the sequence of customized trade recommendations.

12. The method of claim 9, further comprising:
updating the trade recommendations at predetermined intervals.

13. The method of claim 9, further comprising:
synchronizing information contained in the portfolio with a brokerage account.

14. The method of claim 9, wherein each of the trade recommendations specifies a price type.

15. The method of claim 9, wherein each of the trade recommendations specifies a trade type.

16. The method of claim 9, further comprising:
providing a computer-network interface for comparing historical or projected returns of the investment strategies;
providing a computer-network interface for selecting one or more of the investment strategies based on the comparison of historical or projected returns; and
providing a computer-network interface for subscribing to the selected investment strategies.

17. The method of claim 9, further comprising:
providing a computer-network interface for defining and storing initial parameters for each of the investment strategies, wherein the initial parameters include an initial investment amount, a recommended minimum investment amount, a tradable financial instrument set, and allowed position types.

* * * * *